United States Patent
Pezeshki et al.

(10) Patent No.: US 12,108,369 B2
(45) Date of Patent: Oct. 1, 2024

(54) REPORTING SWITCHING GAPS FOR BEAMFORMING

(71) Applicant: QUALCOMM Incorporated, San Diego, CA (US)

(72) Inventors: Hamed Pezeshki, San Diego, CA (US); Tao Luo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/182,968

(22) Filed: Feb. 23, 2021

(65) Prior Publication Data

US 2022/0272694 A1     Aug. 25, 2022

(51) Int. Cl.
*H04W 72/0446* (2023.01)
*H04B 7/06* (2006.01)
*H04W 8/24* (2009.01)

(52) U.S. Cl.
CPC ...... *H04W 72/0446* (2013.01); *H04B 7/0617* (2013.01); *H04W 8/24* (2013.01)

(58) Field of Classification Search
CPC ..... H04W 72/0446; H04W 8/24; H04W 8/02; H04B 7/0617; H04B 7/0695; H04B 7/088; H04L 5/0023; H04L 5/0048
See application file for complete search history.

(56) References Cited

U.S. PATENT DOCUMENTS

| | | | |
|---|---|---|---|
| 2003/0080887 A1* | 5/2003 | Havelock | G10K 11/346 341/143 |
| 2016/0021548 A1 | 1/2016 | Raghavan et al. | |
| 2017/0264360 A1* | 9/2017 | Buehler | H04B 7/0617 |
| 2017/0331670 A1* | 11/2017 | Parkvall | H04B 7/0617 |
| 2018/0084440 A1* | 3/2018 | Nagaraja | H04B 7/0695 |
| 2018/0092156 A1* | 3/2018 | Kim | H04W 72/20 |
| 2019/0123798 A1* | 4/2019 | Lou | H04B 7/0617 |

(Continued)

FOREIGN PATENT DOCUMENTS

WO     2020022748 A1     1/2020

OTHER PUBLICATIONS

"3rd Generation Partnership Project, Technical Specification Group Radio Access Network, NR, General aspects for BS RF for NR (Release 15)", 3GPP Standard, Technical Report, 3GPP TR 38.817-02, 3rd Generation Partnership Project (3GPP), Mobile Competence Centre, 650, Route Des Lucioles, F-06921 Sophia-Antipolis Cedex, France, vol. RAN WG4, No. V0.5.0, Jan. 12, 2018 (Jan. 12, 2018), pp. 1-78, XP051392636, [retrieved on Jan. 12, 2018], Section 9.10.2.

(Continued)

*Primary Examiner* — Chirag G Shah
*Assistant Examiner* — Joshua Smith
(74) *Attorney, Agent, or Firm* — Harrity & Harrity, LLP

(57) ABSTRACT

Various aspects of the present disclosure generally relate to wireless communication. In some aspects, a user equipment (UE) may transmit beamforming capability information including a switching gap that indicates an amount of time associated with the UE switching between an analog beamforming mode and a digital beamforming mode. The UE may receive a resource allocation based at least in part on the beamforming capability information. Numerous other aspects are described.

30 Claims, 9 Drawing Sheets

(56) References Cited

U.S. PATENT DOCUMENTS

| | | | | |
|---|---|---|---|---|
| 2019/0181932 A1* | 6/2019 | Jayawardene | ....... | H04B 7/0617 |
| 2019/0342047 A1* | 11/2019 | Kim | ................... | H04W 72/046 |
| 2019/0357159 A1* | 11/2019 | Pan | ................... | H04W 72/046 |
| 2019/0363919 A1* | 11/2019 | Bai | ...................... | H04B 7/0695 |
| 2020/0037385 A1* | 1/2020 | Park | ...................... | H04W 72/04 |
| 2020/0059398 A1* | 2/2020 | Pan | .................. | H04W 72/0413 |
| 2020/0059958 A1* | 2/2020 | Chen | ................... | H04B 7/0617 |
| 2020/0136717 A1* | 4/2020 | Li | ........................ | H04B 7/0689 |
| 2020/0288479 A1* | 9/2020 | Xi | ........................ | H04W 72/042 |
| 2021/0050976 A1* | 2/2021 | Noh | ................... | H04B 7/0626 |
| 2021/0083748 A1* | 3/2021 | Guan | .................. | H04B 7/0695 |
| 2021/0258063 A1* | 8/2021 | Ottersten | ............. | H04B 7/0695 |
| 2021/0307068 A1* | 9/2021 | Kim | ................... | H04B 7/0617 |
| 2022/0231751 A1* | 7/2022 | Grant | .................... | H04B 7/063 |
| 2022/0239014 A1* | 7/2022 | Sikri | ................... | H04B 7/0617 |

OTHER PUBLICATIONS

CATT: "Discussion on Beam Switching Delay for NR", 3GPP Draft, R4-1706594 Final, 3rd Generation Partnership Project (3GPP), Mobile Competence Centre, 650, Route Des Lucioles, F-06921 Sophia-Antipolis Cedex, France, vol. RAN WG4, No. Qingdao, China, Jun. 27, 2017-Jun. 29, 2017, Jun. 19, 2017 (Jun. 19, 2017), XP051308381, Retrieved from the Internet: URL: http://www.3gpp.org/ftp/tsg_ran/WG4_Radio/TSGR4_AHs/TSGR4_NR_Jun2017/Docs/, [retrieved on Jun. 19, 2017], Section 2.
International Search Report and Written Opinion—PCT/US2021/073164—ISA/EPO—May 13, 2022.

* cited by examiner

REPORTING SWITCHING GAPS FOR BEAMFORMING

FIELD OF THE DISCLOSURE

Aspects of the present disclosure generally relate to wireless communication and to techniques and apparatuses for reporting switching gaps for beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors coupled to the memory, the memory and the one or more processors configured to: transmit beamforming capability information including a switching gap that indicates an amount of time associated with the UE switching between an analog beamforming mode and a digital beamforming mode; and receive a resource allocation based at least in part on the beamforming capability information.

In some aspects, a base station for wireless communication includes a memory; and one or more processors coupled to the memory, the memory and the one or more processors configured to: receive, from a UE, beamforming capability information including a switching gap that indicates an amount of time associated with the UE switching between an analog beamforming mode and a digital beamforming mode; transmit a resource allocation based at least in part on the beamforming capability information.

In some aspects, a method of wireless communication performed by a UE includes transmitting beamforming capability information including a switching gap that indicates an amount of time associated with the UE switching between an analog beamforming mode and a digital beamforming mode; and receiving a resource allocation based at least in part on the beamforming capability information.

In some aspects, a method of wireless communication performed by a base station includes receiving, from a UE, beamforming capability information including a switching gap that indicates an amount of time associated with the UE switching between an analog beamforming mode and a digital beamforming mode; transmitting a resource allocation based at least in part on the beamforming capability information.

In some aspects, a non-transitory computer-readable medium storing a set of instructions for wireless communication includes one or more instructions that, when executed by one or more processors of a UE, cause the UE to: transmit beamforming capability information including a switching gap that indicates an amount of time associated with the UE switching between an analog beamforming mode and a digital beamforming mode; and receive a resource allocation based at least in part on the beamforming capability information.

In some aspects, a non-transitory computer-readable medium storing a set of instructions for wireless communication includes one or more instructions that, when executed by one or more processors of a base station, cause the base station to: receive, from a UE, beamforming capability information including a switching gap that indicates an amount of time associated with the UE switching between an analog beamforming mode and a digital beamforming mode; transmit a resource allocation based at least in part on the beamforming capability information.

In some aspects, an apparatus for wireless communication includes means for transmitting beamforming capability information including a switching gap that indicates an amount of time associated with the apparatus switching between an analog beamforming mode and a digital beamforming mode; and means for receiving a resource allocation based at least in part on the beamforming capability information.

In some aspects, an apparatus for wireless communication includes means for receiving, from a UE, beamforming capability information including a switching gap that indicates an amount of time associated with the UE switching between an analog beamforming mode and a digital beamforming mode; means for transmitting a resource allocation based at least in part on the beamforming capability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
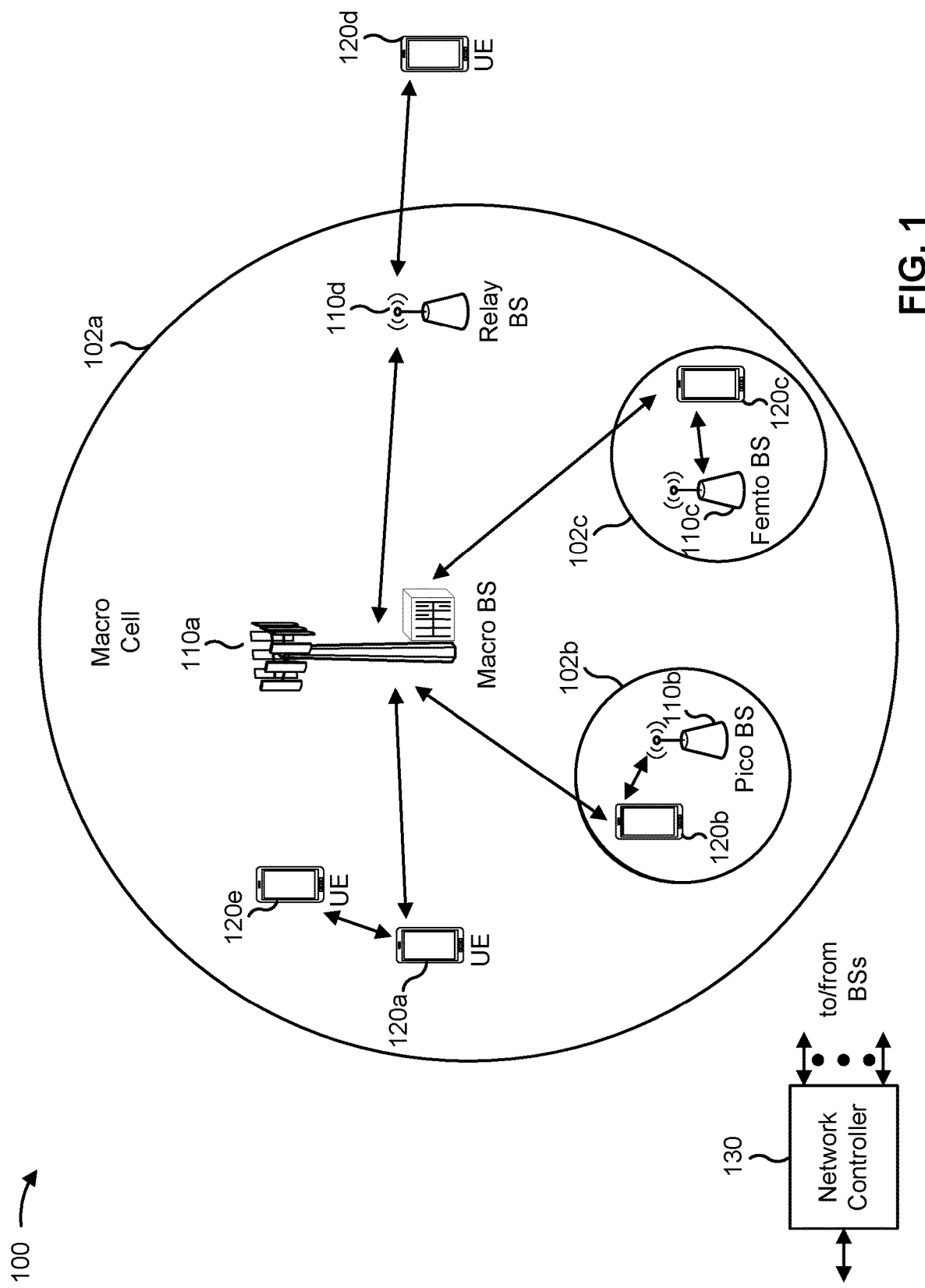
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
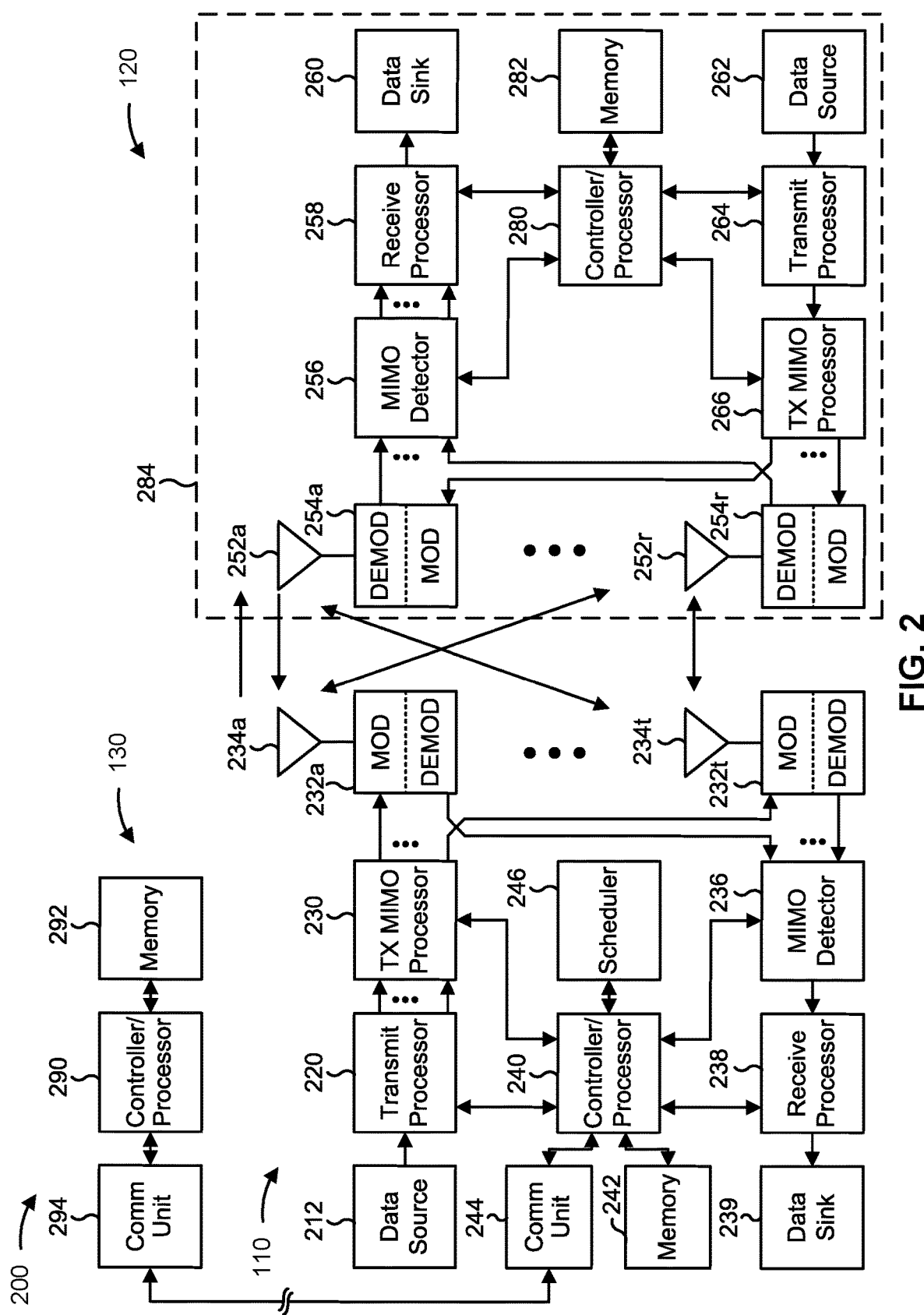
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with reporting switching gaps for beamforming, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for transmitting beamforming capability information including a switching gap that indicates an amount of time associated with the UE switching between an analog beamforming mode and a digital beamforming mode; or means for receiving a resource allocation based at least in part on the beamforming capability information. In some aspects, the UE includes means for communicating based at least in part on the digital beamforming mode. In some aspects, the UE includes means for communicating based at least in part on the analog beamforming mode. In some aspects, the UE includes means for determining CSI based at least in part on the CSI-RS and by using a first machine learning procedure or estimating an underlying channel based at least in part on the DMRS and by using a second machine learning procedure. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving, from a UE, beamforming capability information including a switching gap that indicates an amount of time associated with the UE switching between an analog beamforming mode and a digital beamforming mode; means for transmitting a resource allocation based at least in part on the beamforming capability information. In some aspects, the base station includes means for communicating based at least in part on the digital beamforming mode. In some aspects, the base station includes means for communicating based at least in part on the analog beamforming mode. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
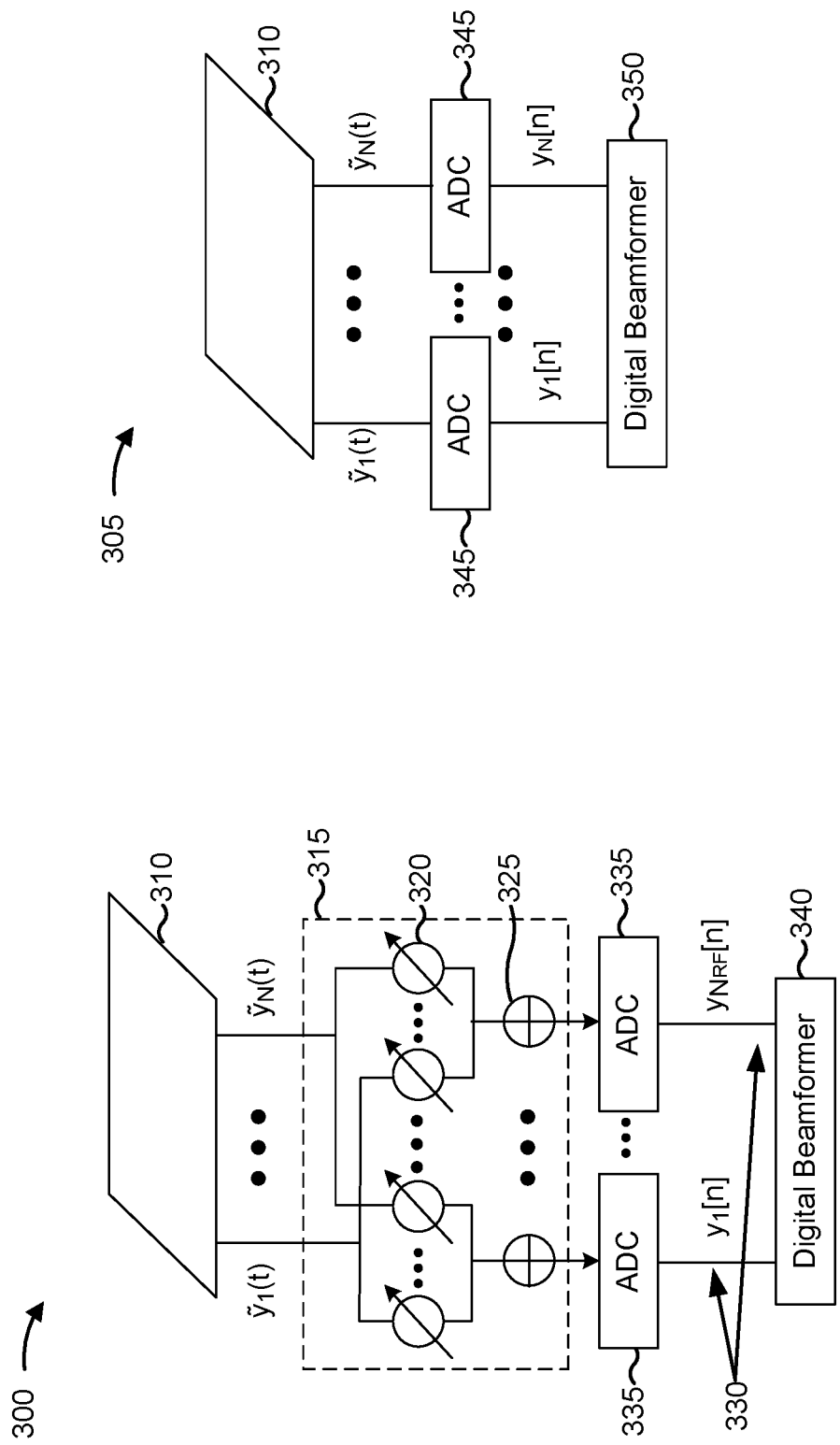
FIGS. 3 and 4 are diagrams illustrating examples of beamforming architectures that support beamforming for millimeter wave communications, in accordance with the present disclosure.

FIG. 3 is a diagram illustrating examples of beamforming architectures 300 and 305 that support beamforming for millimeter wave communications, in accordance with the present disclosure. In some aspects, architecture 300 and/or 305 may implement aspects of wireless network 100. In some aspects, architectures 300 and/or 305 may be implemented in a receiving device (e.g., a wireless communication device, UE, or base station), as described herein. For example, the architectures 300 and 305 may show receive chains (e.g., radio frequency (RF) chains) for reception of communications by a receiving device. The architectures 300 and 305, and the architectures 400 and 405, may be particularly useful for communication in a millimeter wave range, such as FR2 and/or the like.

Broadly, FIG. 3 is a diagram illustrating example hardware components of a wireless communication device in accordance with certain aspects of the disclosure. The illustrated components may include those that may be used for antenna element selection and/or for beamforming for reception of wireless signals. There are numerous architectures for antenna element selection and implementing phase shifting, only two examples of which are illustrated here. Transmission lines or other waveguides, wires, traces, and/or the like are shown connecting the various components to illustrate how signals to be transmitted may travel between components.

Architecture 300 includes a hybrid beamforming architecture. Architecture 305 includes a fully digital beamforming architecture. The architectures 300 and 305 include an antenna array 310. The antenna array 310 may include N antenna elements (not shown). An antenna element may include one or more sub-elements for radiating or receiving RF signals. For example, a single antenna element may include a first sub-element cross-polarized with a second sub-element that can be used to independently transmit or receive cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

A signal $\tilde{y}_n(t)$ received at an antenna n at a time t may propagate to an analog portion 315 of the architecture 300. The analog portion 315 may include a plurality of phase shifters 320 and one or more amplifiers 325 (e.g., one amplifier 325 per RF chain, multiple amplifiers 325 per RF chain, or one amplifier 325 for multiple RF chains).

The architecture 300 includes a plurality of RF chains 330 (e.g., $N_{RF}$ RF chains). $N_{RF}$ may be smaller than N (e.g., the number of RF chains 330 may be smaller than the number of antenna elements of the architecture 300). In some examples, $N_{RF}$ may be 2 or 4. An architecture including a plurality of RF chains 330 and analog phase shifters and amplifiers may be referred to as a hybrid beamforming architecture. An architecture including a single RF chain (e.g., $N_{RF}=1$) may be referred to as an analog beamforming architecture. An architecture 305 including a digital beamformer without analog phase shifters and amplifiers may be referred to as a digital beamforming architecture or a digital-only beamforming architecture.

Each RF chain 330 of architecture 300 may be associated with a respective analog-to-digital converter (ADC) 335. The ADCs 335 of the RF chains 330 may perform analog-to-digital conversion of the signals received from the analog portion 315. The ADCs 335 may provide digital signals $y_1[n]$ through $y_{N_{RF}}[n]$ to a digital beamformer 340. The digital beamformer 340 may be implemented at the baseband or may interface with a baseband processor. The digital beamformer 340 may perform digital-domain signal processing, such as digital baseband processing, controlling operation of components 310/315/320/325/335, spatial configuration of the communication of the wireless communication device, and so on.

The architecture 305 omits the analog portion 315 (e.g., the phase shifters 320, the amplifiers 325, and so on). As shown, the architecture 305 provides an ADC 345 per antenna element (e.g., N ADCs 345 for the N antenna elements). The wireless communication device may receive signals via antenna elements of the antenna array 310, provide the signals to the ADCs 345, convert the signals to the digital domain, then process the signals by the digital beamformer 350. In the architecture 305, the digital beamformer 350 handles phase shifting, mixing, and/or other operations handled by the analog portion 315 of the architecture 300.

In some aspects, an ADC 335/345 may be associated with a bit granularity. An ADC 335/345 may receive an analog signal, which is generally not quantized, and may output a digital signal that is quantized in accordance with the bit granularity. For example, a 4-bit ADC may output a 4-bit quantization of a signal, whereas an 8-bit ADC may output an 8-bit quantization of a signal. Generally, higher-bit-granularity ADCs (e.g., 8-bit ADCs) are associated with a larger baseband processing burden and higher power consumption than lower-bit-granularity ADCs (e.g., 3-bit or 4-bit ADCs).

The digital beamforming architecture 305 may provide increased flexibility for spatial signal processing relative to the hybrid beamforming architecture 300, which may facilitate maximum ratio combining, individual adjustment of antenna phase, and so on. However, at a given bit granularity of ADC, the increased number of ADCs 345 associated with the digital beamforming architecture 305 may create a significantly heavier processing and power burden at the digital beamformer 350 than at the digital beamformer 340 of the hybrid beamforming architecture 300. For example, the hybrid beamforming architecture 300 may be expected to have $N_{RF}$ ADCs 335, whereas the digital beamforming architecture 305 may be expected to have N ADCs 345. To mitigate this processing and power burden, some digital beamforming architectures 300 may use ADCs with a lower bit granularity than an ADC 335. For example, a 3-bit or 4-bit granularity for ADC 345 may reduce baseband processing load and power consumption relative to an 8-bit granularity for ADC 345, and may still provide performance benefits over some hybrid beamforming architectures 300, even those associated with higher ADC bit granularities, such as 8 bits.

A wireless communication device may be implemented with architecture 300 and/or architecture 305. The wireless communication device may be configured to use one of a set of architectures for communicating with a base station. However, a static selection of a single architecture may limit benefits of having the wireless communication device implemented with multiple architectures. In some aspects, static selection of the single architecture may consume computing, communication, network, and/or power resources by using the single architecture to transmit and/or receive communications. For example, the single architecture may be efficient (e.g., use an appropriate spectral efficiency, resolution, and/or power consumption and/or the like) for a first set of communications and another architecture may be efficient for a second set of communications.

As indicated above, FIG. 3 is provided as an example. Other examples may differ from what is described with regard to FIG. 3.

In some cases, millimeter wave receivers may use analog or hybrid beamforming. In these cases, beamforming may be performed in RF or at an intermediate frequency (IF) through a bank of phase shifters (PSs)—one per antenna element. This architecture reduces the power consumption by using only one high-resolution analog to digital converter (ADC) per RF chain at the receiver. While analog and hybrid beamforming are power efficient, analog and hybrid beamforming may be capable of receiving in only one or a few directions at a given time. This may limit their multiplexing capabilities.

In contrast, in fully digital architectures, beamforming may be performed in baseband. Each antenna has an associated ADC at the receiver enabling the receiver to simultaneously direct beams in theoretically infinite directions at a given time. However, for wide-band systems, high-resolution ADCs can consume a relatively large amount of power. To enable fully digital receiver (Rx) beamforming for millimeter wave, ADCs with few-bit resolution (e.g., less than 5 bits) may be used, so as to be power-efficient and cost-efficient.

Figure 4:
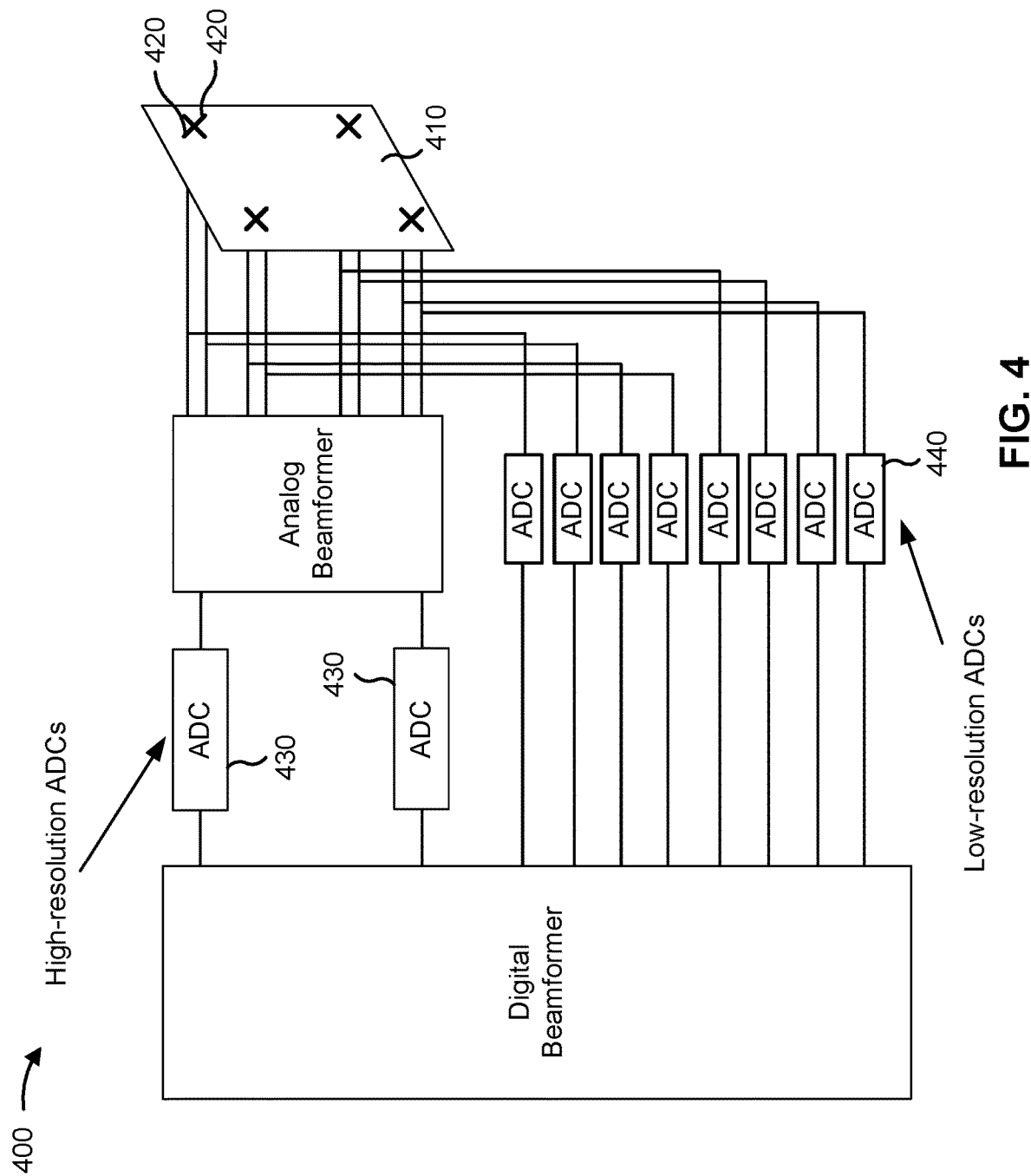

FIG. 4 is a diagram illustrating an example of a beamforming architecture 400 that supports beamforming for millimeter wave communications, in accordance with the present disclosure. In some aspects, the architecture 400 may implement aspects of wireless network 100. In some aspects, architecture 400 may be implemented in a transmitting device (e.g., a wireless communication device, UE, or base station), as described herein. For example, the architecture 400 may include transmission chains (e.g., radio frequency (RF) chains) for transmission of communications by the transmitting device.

Example beamforming architecture 400 is a mixed-ADC architecture that incorporates low-resolution ADCs in millimeter wave, in conjunction with an analog beamforming architecture. As shown, for example, the architecture 400 may include an antenna array 410 that includes 8 antenna elements 420. Two high-resolution ADCs 430 may be associated with an analog beamformer and eight low-resolution ADCs 440 may be associated with a digital beamformer (e.g., that bypass the analog beamformer). A UE that implements the example beamforming architecture 400 may be capable of switching between an analog beamforming mode, in which the high-resolution ADCs 430 are activated and used, and a digital beamforming mode, in which the low-resolution ADCs are activated and used (and the high-resolution ADCs are deactivated). This ability to switch between the modes may provide operating efficiency.

However, the UE may take some amount of time, referred to herein as a switching gap, to switch between the analog beamforming mode and the digital beamforming mode. During a switching gap, the UE may not be able to receive a communication, as a full Rx chain may not be active during the switching gap. Thus, transmissions from a base station during a switching gap may be missed by the UE and, in some cases, may be retransmitted until the UE confirms receipt, which may have a negative impact on network performance. For example, due to a UE switching between beamforming modes during a switching gap, throughput and efficiency may be reduced, and power consumption of the UE may be increased.

Some techniques and apparatuses described herein provide signaling of switching gap information for beamforming. For example, a UE may signal an indication of a switching gap. In some aspects, a switching gap for switching from an analog beamforming mode to a digital beamforming mode may be different than a switching gap for switching from a digital beamforming mode to an analog beamforming mode, and the UE may indicate both switching gaps. The switching gap information may be indicated in a capability report associated with the UE and may be used, by a base station, to schedule transmissions (e.g., reference signals, uplink control and/or data transmissions, and/or downlink control and/or data transmissions) so that the transmissions are not transmitted during switching gaps. In this way, efficiency of communication is improved. Thus, power usage of the UE may be reduced and some aspects may have a positive impact on network performance. In some aspects, the techniques and apparatuses described herein may be particularly useful for millimeter wave communications, though the techniques and apparatuses described herein can be applied in frequency ranges other than millimeter wave.

As indicated above, FIG. 4 is provided as an example. Other examples may differ from what is described with regard to FIG. 4.

Figure 5:
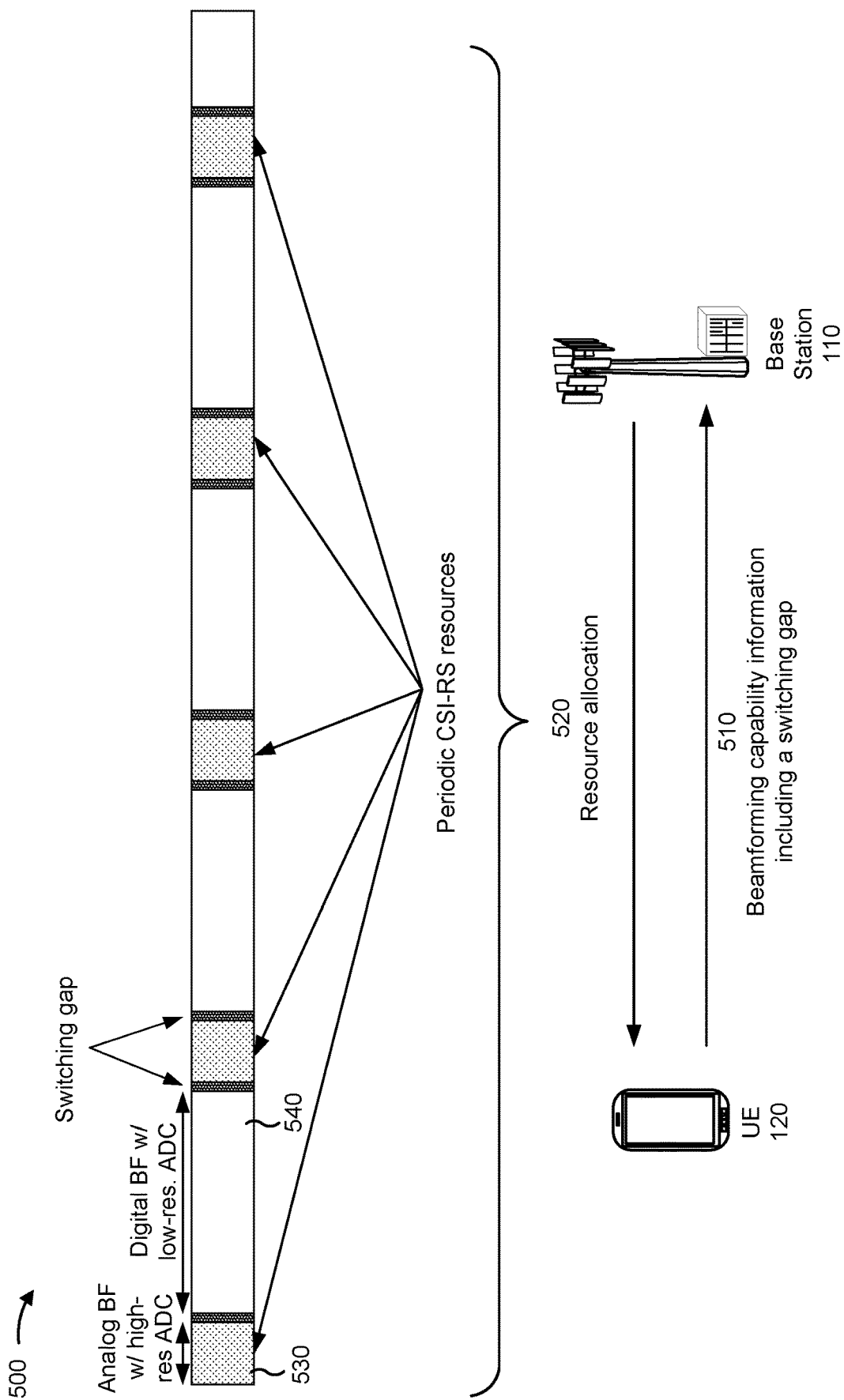
FIG. 5 is a diagram illustrating an example associated with reporting switching gaps for beamforming, in accordance with the present disclosure.

FIG. 5 is a diagram illustrating an example 500 of reporting switching gaps for beamforming, in accordance with the present disclosure. As shown, example 500 includes a UE 120 and a base station 110. The UE 120 may include a beamforming architecture capable of switching between an analog beamforming mode using high-resolution ADCs and a digital beamforming mode using low-resolution ADCs. The beamforming architecture may be similar to the example beamforming architecture shown in FIG. 4.

As shown by reference number 510, the UE 120 may transmit (and the base station 110 may receive) beamforming capability information including a switching gap that indicates an amount of time associated with the UE switching between an analog beamforming mode and a digital beamforming mode. The UE 120 may transmit the beamforming capability information using medium access control (MAC) signaling (e.g., a MAC control element (MAC-CE)), uplink control information (UCI), and/or radio resource control (RRC) signaling, among other examples. In some aspects, the beamforming capability information may be associated with a millimeter wave frequency. The capability information may be included in a UE capability report.

In some aspects, the switching gap may indicate an amount of time associated with the UE 120 switching from the analog beamforming mode to the digital beamforming mode. In some aspects, the switching gap may indicate an amount of time associated with the UE 120 switching from the digital beamforming mode to the analog beamforming mode. In some aspects, the beamforming capability information may indicate two switching gaps: a switching gap that indicates an amount of time associated with the UE 120 switching from the digital beamforming mode to the analog beamforming mode, and an additional switching gap that indicates an amount of time associated with the UE 120 switching from the analog beamforming mode to the digital beamforming mode.

As shown by reference number 520, the UE 120 may receive (and the base station 110 may transmit) a resource allocation based at least in part on the beamforming capability information. For example, the base station 110 may transmit the resource allocation using MAC signaling, downlink control information (DCI), and/or RRC signaling, among other examples. As indicated above, the base station 110 may transmit the resource allocation based at least in part on the beamforming capability information. For example, the base station 110 may time a transmission of the resource allocation so that the base station 110 does not transmit the resource allocation during a switching gap, thereby causing the UE to fail to receive the resource allocation. Instead, the base station 110 may transmit the resource allocation before the switching gap occurs, or after the switching gap occurs.

Additionally or alternatively, the resource allocation itself may be based at least in part on the beamforming capability information. As shown, for example, the configuration information may indicate a first set of resources 530 during which the UE 120 is to use a first beamforming mode (e.g., an analog beamforming mode), a second set of resources 540 during which the UE 120 is to use a second beamforming mode (e.g., a digital beamforming mode), and one or more switching gaps.

In some aspects, the UE 120 may communicate with the base station 110 based at least in part on the digital beamforming mode or the analog beamforming mode. The UE 120 may communicate with the base station 110 based at least in part on the digital beamforming mode using one or more low-resolution ADCs. The UE 120 may communicate with the base station 110 based at least in part on the analog beamforming mode using one or more high-resolution ADCs. The UE 120 may communicate with the base station 110 based at least in part on the digital beamforming mode or the analog beamforming mode by communicating at least one of data signals, control signals, or reference signals.

As shown in FIG. 5, the reference signal may include a channel state information (CSI)-reference signal (CSI-RS), for which periodic resources may be scheduled by the resource allocation. In some aspects, the CSI-RS may be received in a dedicated symbol having no other signal multiplexed with the CSI-RS in the dedicated symbol. In this way, the analog beamforming may be used to receive the CSI-RS and digital beamforming may be used to receive other types of communications. In some aspects, the UE 120 may determine CSI based at least in part on the CSI-RS and by using a machine learning procedure. For example, in a case in which a base station transmission beam is fixed, the signal may be associated with two ports at the base station side of the communication. By sweeping a UE receive beam and making multiple 2×2 measurements (where each UE receive beam corresponds to a 2×2 measurement), the UE 120 may estimate CSI for the underlying 8×2 channel (wherein 8 is the number of antennas that the UE 120 has).

In some aspects, the reference signal may include a demodulation reference signal (DMRS). Resources for the DMRS may be scheduled by the resource allocation. In some aspects, the UE 120 may estimate an underlying channel based at least in part on the DMRS and by using a machine learning procedure. For example, in a case in which a base station transmission beam is fixed, the signal may be associated with two ports at the base station side of the communication. By sweeping a UE receive beam and making multiple 2×2 measurements, the UE 120 may estimate the underlying 8×2 channel. For, example, the UE 120 may use a machine learning procedure to solve the inverse problem of estimating the underlying 8×2 channel.

As indicated above, FIG. 5 is provided as an example. Other examples may differ from what is described with regard to FIG. 5.

Figure 6:
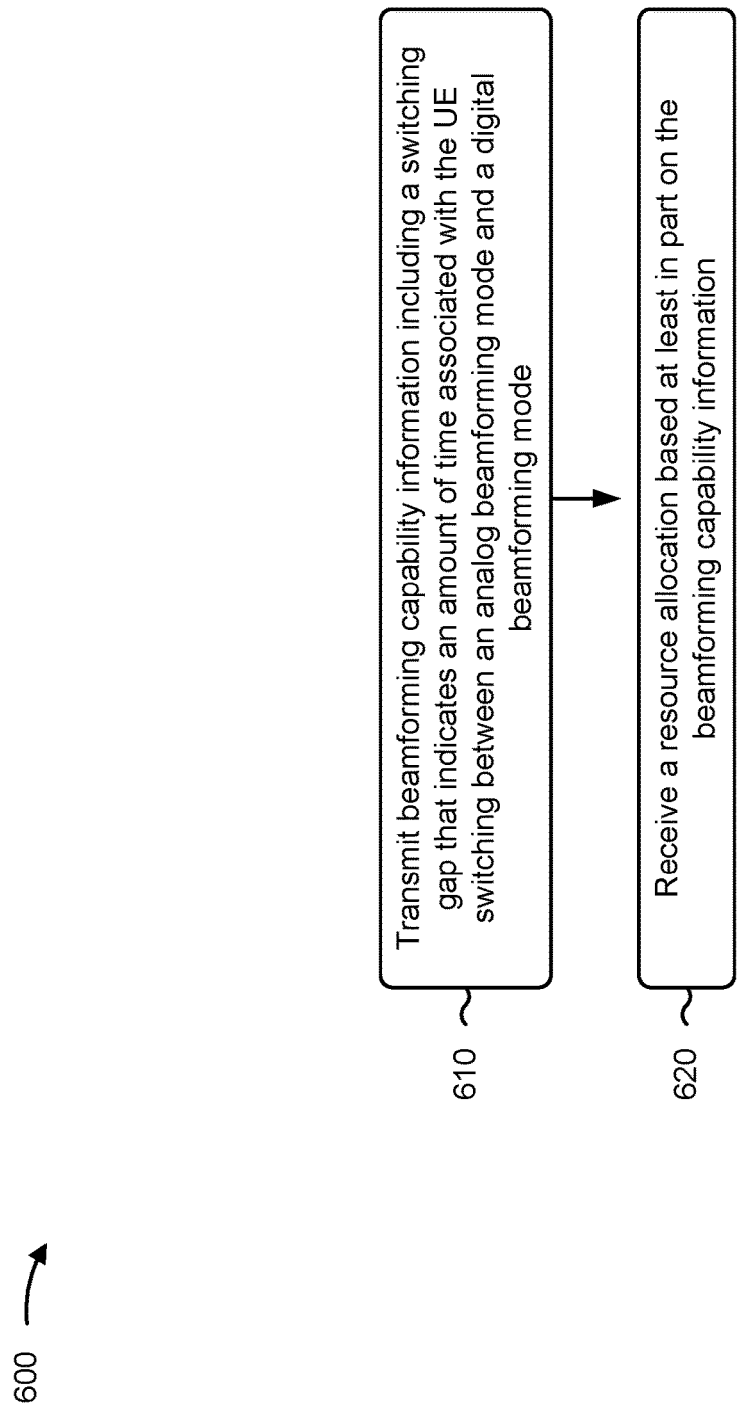
FIGS. 6 and 7 are diagrams illustrating example processes associated with reporting switching gaps for beamforming, in accordance with the present disclosure.

FIG. 6 is a diagram illustrating an example process 600 performed, for example, by a UE, in accordance with the present disclosure. Example process 600 is an example where the UE (e.g., UE 120) performs operations associated with reporting switching gaps for beamforming.

As shown in FIG. 6, in some aspects, process 600 may include transmitting beamforming capability information including a switching gap that indicates an amount of time associated with the UE switching between an analog beamforming mode and a digital beamforming mode (block 610). For example, the UE (e.g., using transmission component 804, depicted in FIG. 8) may transmit beamforming capability information including a switching gap that indicates an amount of time associated with the UE switching between an analog beamforming mode and a digital beamforming mode, as described in connection with FIG. 5. In some aspects, the beamforming capability information is associated with a millimeter wave frequency. In some aspects, the capability information is included in a UE capability report.

In some aspects, the switching gap indicates an amount of time associated with the UE switching from the analog beamforming mode to the digital beamforming mode. In other aspects, the switching gap indicates an amount of time associated with the UE switching from the digital beamforming mode to the analog beamforming mode. In some aspects, the beamforming capability information includes an additional switching gap that indicates an amount of time associated with the UE switching from the analog beamforming mode to the digital beamforming mode.

As further shown in FIG. 6, in some aspects, process 600 may include receiving a resource allocation based at least in part on the beamforming capability information (block 620). For example, the UE (e.g., using reception component 802, depicted in FIG. 8) may receive a resource allocation based at least in part on the beamforming capability information, as described in connection with FIG. 5. In some aspects, the process 600 includes communicating based at least in part on the digital beamforming mode. In some aspects, communicating based at least in part on the digital beamforming mode comprises communicating using one or more low-resolution analog to digital converters. In some aspects, communicating based at least in part on the digital beamforming mode comprises communicating at least one of data signals or control signals.

In some aspects, process 600 includes communicating based at least in part on the analog beamforming mode. In some aspects, communicating based at least in part on the analog beamforming mode comprises communicating using one or more high-resolution analog to digital converters. In some aspects, communicating based at least in part on the analog beamforming mode comprises receiving a reference signal. In some aspects, the reference signal comprises a CSI-RS or a DMRS. In some aspects, the CSI-RS is received in a dedicated symbol having no other signal multiplexed with the CSI-RS in the dedicated symbol. In some aspects, process 600 includes determining CSI based at least in part on the CSI-RS and by using a first machine learning procedure or estimating an underlying channel based at least in part on the DMRS and by using a second machine learning procedure.

Process 600 may include additional aspects, such as any single aspect or any combination of aspects described above and/or in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
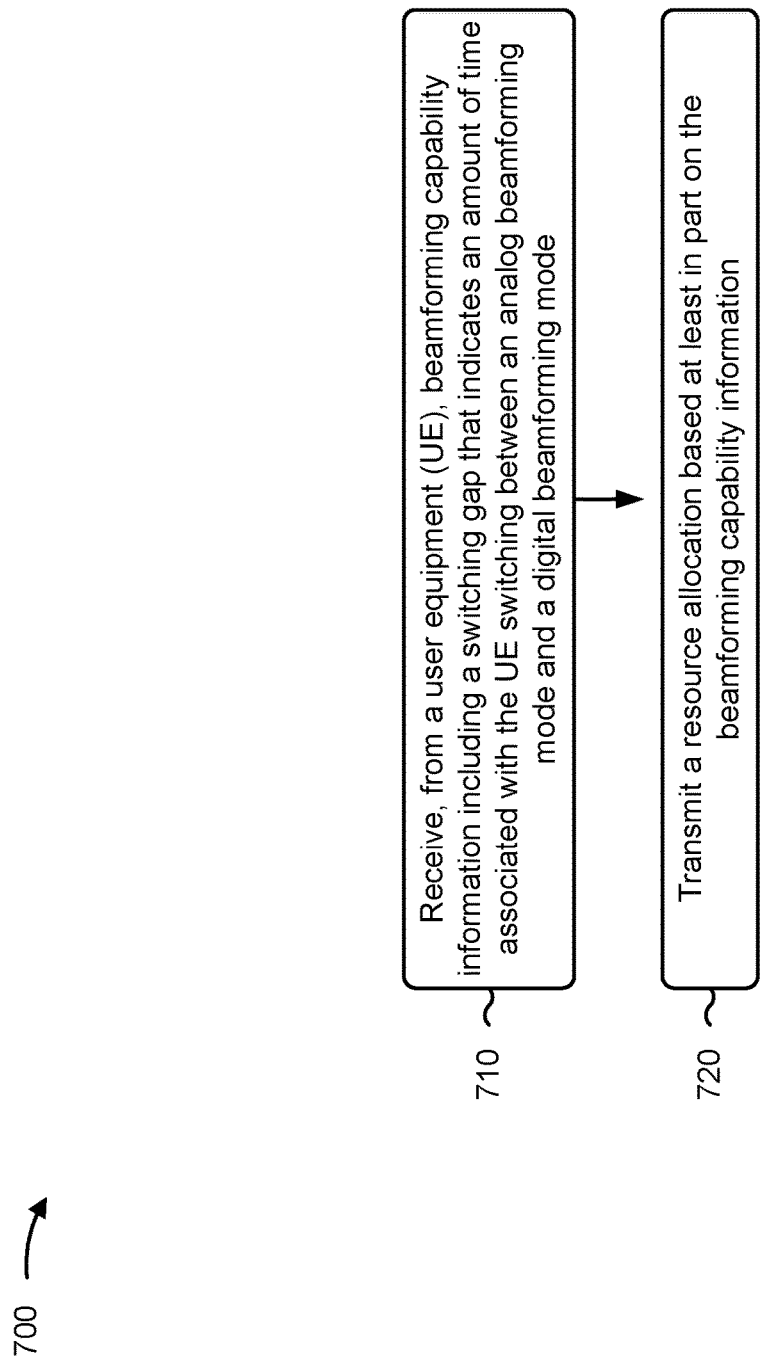

FIG. 7 is a diagram illustrating an example process 700 performed, for example, by a base station, in accordance with the present disclosure. Example process 700 is an example where the base station (e.g., base station 110) performs operations associated with reporting switching gaps for beamforming.

As shown in FIG. 7, in some aspects, process 700 may include receiving, from a UE, beamforming capability information including a switching gap that indicates an amount of time associated with the UE switching between an analog beamforming mode and a digital beamforming mode (block 710). For example, the base station (e.g., using reception component 902, depicted in FIG. 9) may receive, from a UE, beamforming capability information including a switching gap that indicates an amount of time associated with the UE switching between an analog beamforming mode and a digital beamforming mode, as described in connection with FIG. 5. In some aspects, the beamforming capability information is associated with a millimeter wave frequency. In some aspects, the capability information is included in a UE capability report.

In some aspects, the switching gap indicates an amount of time associated with the UE switching from the analog beamforming mode to the digital beamforming mode. In other aspects, the switching gap indicates an amount of time associated with the UE switching from the digital beamforming mode to the analog beamforming mode. In some aspects, the beamforming capability information includes an additional switching gap that indicates an amount of time associated with the UE switching from the analog beamforming mode to the digital beamforming mode.

As further shown in FIG. 7, in some aspects, process 700 may include transmitting a resource allocation at least in part on the beamforming capability information (block 720). For example, the base station (e.g., using transmission component 904, depicted in FIG. 9) may transmit a resource allocation based at least in part on the beamforming capability information, as described in connection with FIG. 5.

In some aspects, process 700 includes communicating based at least in part on the digital beamforming mode. In some aspects, communicating based at least in part on the digital beamforming mode comprises communicating at least one of data signals or control signals. In some aspects, process 700 includes communicating based at least in part on the analog beamforming mode. In some aspects, communicating based at least in part on the analog beamforming mode comprises transmitting a reference signal. In some aspects, the reference signal comprises a CSI-RS or a DMRS. In some aspects, transmitting the CSI-RS comprises transmitting the CSI-RS in a dedicated symbol having no other signal multiplexed with the CSI-RS in the dedicated symbol. In some aspects, the configuration information indicates a resource allocation comprising a first set of time domain resources associated with the reference signal, a second set of time domain resources associated with at least one of data communications or control communications, and a third set of time domain resources associated with the switching gap and disposed between the first set of time domain resources and the second set of time domain resources.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
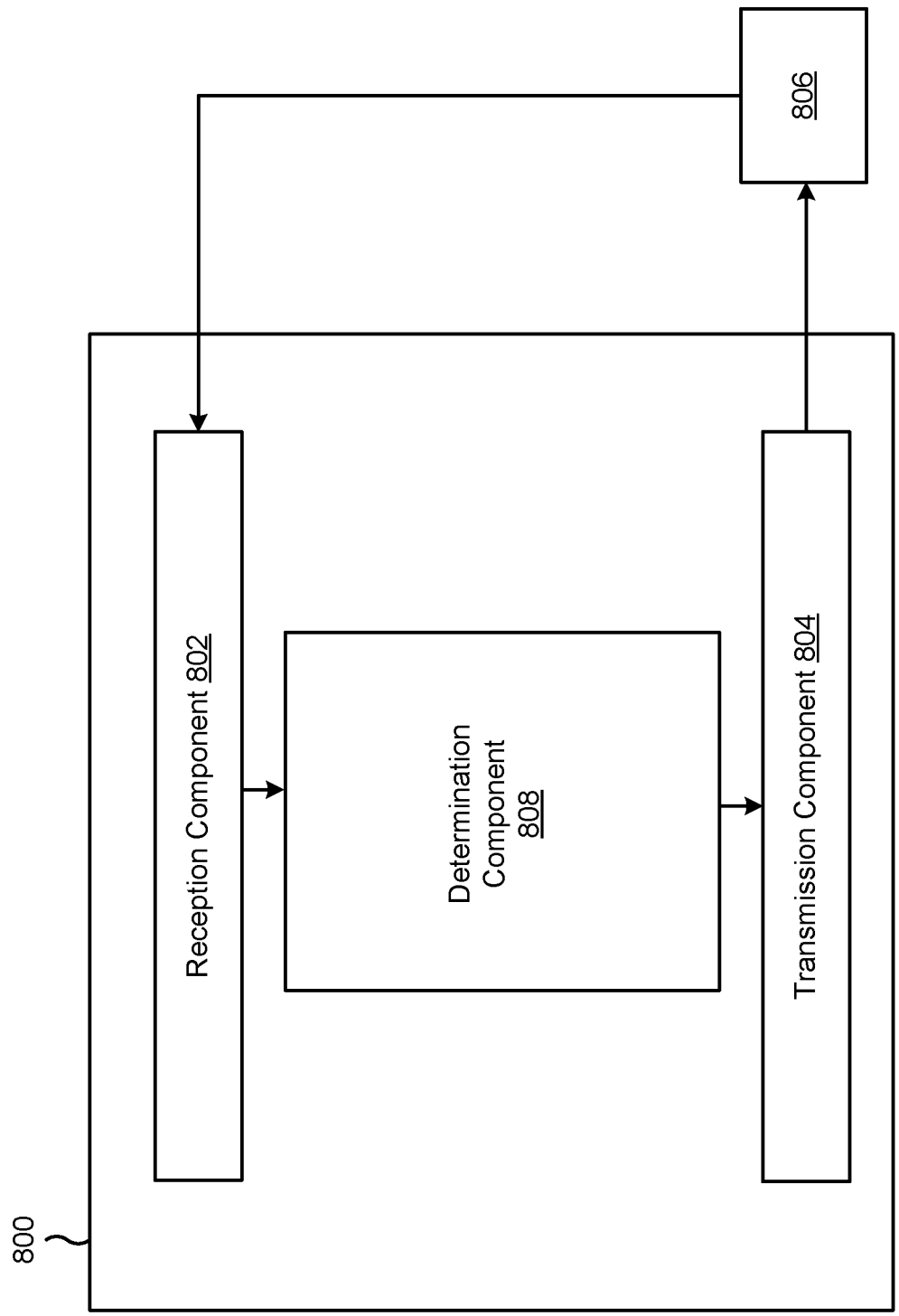
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The transmission component 804 may transmit beamforming capability information including a switching gap that indicates an amount of time associated with the UE switching between an analog beamforming mode and a digital beamforming mode. The reception component 802 may receive a resource allocation based at least in part on the beamforming capability information. The reception component 802 and/or the transmission component 804 may communicate based at least in part on the digital beamforming mode and/or the analog beamforming mode.

The determination component 808 may determine CSI based at least in part on the CSI-RS and by using a first machine learning procedure or estimate an underlying channel based at least in part on the DMRS and by using a second machine learning procedure. In some aspects, the determination component 808 may include one or more antennas, a modulator, a transmit MIMO processor, a transmit processor, a controller/processor, a memory, or a combination thereof, of the UE described above in connection with FIG. 2. In some aspects, the determination component 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
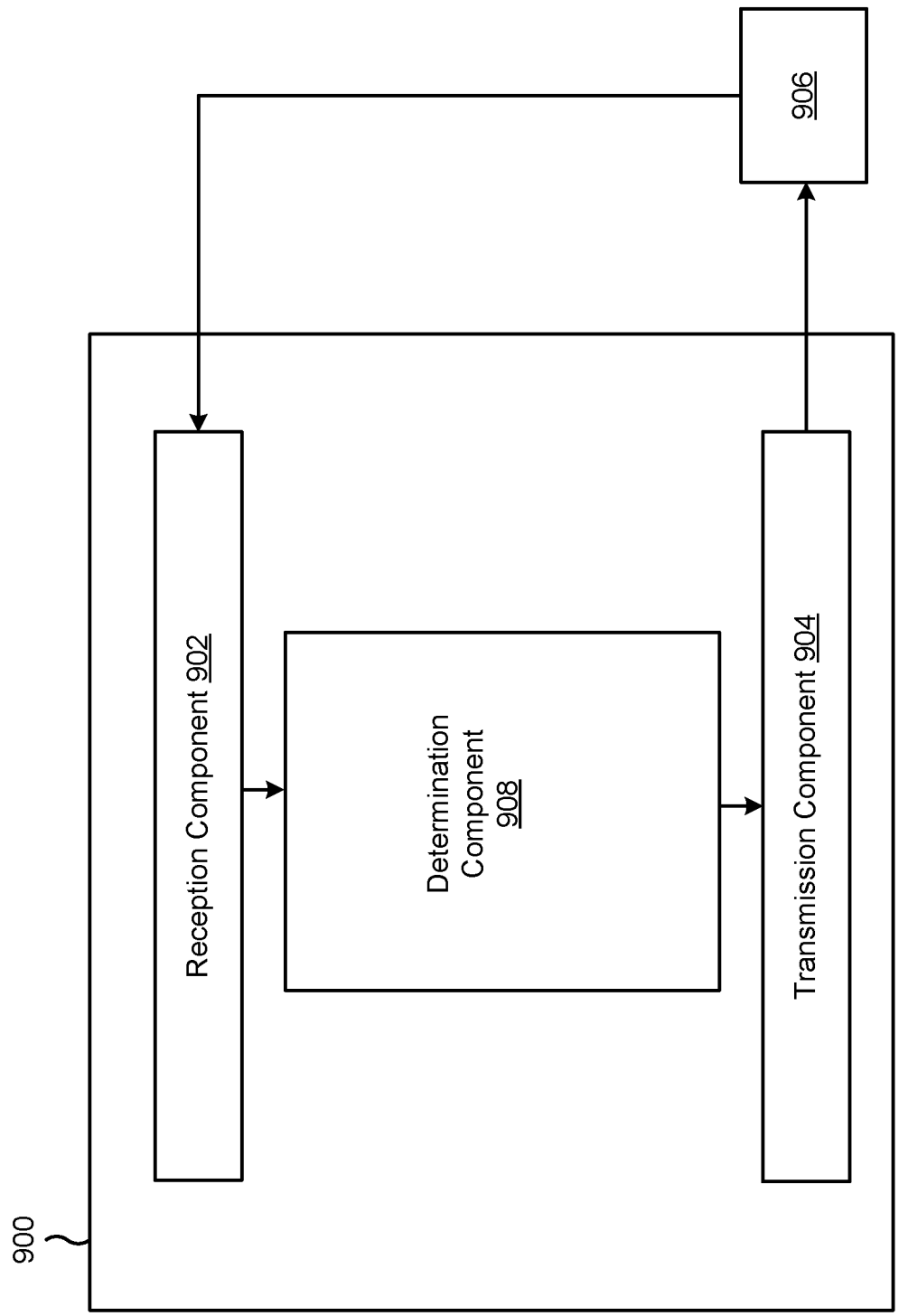

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The reception component 902 may receive, from a UE, beamforming capability information including a switching gap that indicates an amount of time associated with the UE switching between an analog beamforming mode and a digital beamforming mode. The transmission component 904 may transmit a resource allocation based at least in part on the beamforming capability information. The reception component 902 and/or the transmission component 904 may communicate based at least in part on the digital beamforming mode and/or the analog beamforming mode.

The determination component 908 may determine the beamforming configuration information. In some aspects, the determination component 908 may include one or more antennas, a modulator, a transmit MIMO processor, a transmit processor, a controller/processor, a memory, or a combination thereof, of the base station described above in connection with FIG. 2. In some aspects, the determination component 908 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: transmitting beamforming capability information including a switching gap that indicates an amount of time associated with the UE switching between an analog beamforming mode and a digital beamforming mode; and receiving a resource allocation based at least in part on the beamforming capability information.

Aspect 2: The method of Aspect 1, wherein the beamforming capability information is associated with a millimeter wave frequency.

Aspect 3: The method of either of Aspects 1 or 2, wherein the capability information is included in a UE capability report.

Aspect 4: The method of any of Aspects 1-3, wherein the switching gap indicates an amount of time associated with the UE switching from the analog beamforming mode to the digital beamforming mode.

Aspect 5: The method of any of Aspects 1-3, wherein the switching gap indicates an amount of time associated with the UE switching from the digital beamforming mode to the analog beamforming mode.

Aspect 6: The method of Aspect 5, wherein the beamforming capability information includes an additional switching gap that indicates an amount of time associated with the UE switching from the analog beamforming mode to the digital beamforming mode.

Aspect 7: The method of any of Aspects 1-6, further comprising communicating based at least in part on the digital beamforming mode.

Aspect 8: The method of Aspect 7, wherein communicating based at least in part on the digital beamforming mode comprises communicating using one or more low-resolution analog to digital converters.

Aspect 9: The method of either of Aspects 7 or 8, wherein communicating based at least in part on the digital beamforming mode comprises communicating at least one of data signals or control signals.

Aspect 10: The method of any of Aspects 1-9, further comprising communicating based at least in part on the analog beamforming mode.

Aspect 11: The method of Aspect 10, wherein communicating based at least in part on the analog beamforming mode comprises communicating using one or more high-resolution analog to digital converters.

Aspect 12: The method of either of Aspects 10 or 11, wherein communicating based at least in part on the analog beamforming mode comprises receiving a reference signal.

Aspect 13: The method of Aspect 12, wherein the reference signal comprises a channel state information (CSI)-reference signal (CSI-RS) or a demodulation reference signal (DMRS).

Aspect 14: The method of Aspect 13, wherein the CSI-RS is received in a dedicated symbol having no other signal multiplexed with the CSI-RS in the dedicated symbol.

Aspect 15: The method of either of Aspects 13 or 14, further comprising determining CSI based at least in part on the CSI-RS and by using a first machine learning procedure or estimating an underlying channel based at least in part on the DMRS and by using a second machine learning procedure.

Aspect 16: A method of wireless communication performed by a base station, comprising: receiving, from a user equipment (UE), beamforming capability information including a switching gap that indicates an amount of time associated with the UE switching between an analog beamforming mode and a digital beamforming mode; transmitting a resource allocation based at least in part on the beamforming capability information.

Aspect 17: The method of Aspect 16, wherein the beamforming capability information is associated with a millimeter wave frequency.

Aspect 18: The method of either of Aspects 16 or 17, wherein the capability information is included in a UE capability report.

Aspect 19: The method of any of Aspects 16-18, wherein the switching gap indicates an amount of time associated with the UE switching from the analog beamforming mode to the digital beamforming mode.

Aspect 20: The method of any of Aspects 16-18, wherein the switching gap indicates an amount of time associated with the UE switching from the digital beamforming mode to the analog beamforming mode.

Aspect 21: The method of Aspect 20, wherein the beamforming capability information includes an additional switching gap that indicates an amount of time associated with the UE switching from the analog beamforming mode to the digital beamforming mode.

Aspect 22: The method of any of Aspects 16-22, further comprising communicating based at least in part on the digital beamforming mode.

Aspect 23: The method of Aspect 22, wherein communicating based at least in part on the digital beamforming mode comprises communicating at least one of data signals or control signals.

Aspect 24: The method of any of Aspects 16-23, further comprising communicating based at least in part on the analog beamforming mode.

Aspect 25: The method of Aspect 24, wherein communicating based at least in part on the analog beamforming mode comprises transmitting a reference signal.

Aspect 26: The method of Aspect 25, wherein the reference signal comprises a channel state information reference signal (CSI-RS) or a demodulation reference signal (DMRS).

Aspect 27: The method of Aspect 26, wherein transmitting the CSI-RS comprises transmitting the CSI-RS in a dedicated symbol having no other signal multiplexed with the CSI-RS in the dedicated symbol.

Aspect 28: The method of any of Aspects 16-27, wherein the configuration information indicates a resource allocation comprising: a first set of time domain resources associated with the reference signal; a second set of time domain resources associated with at least one of data communications or control communications; and a third set of time domain resources associated with the switching gap and disposed between the first set of time domain resources and the second set of time domain resources.

Aspect 29: An apparatus for wireless communication at a device, comprising a processor; memory coupled with the processor; and instructions stored in the memory and executable by the processor to cause the apparatus to perform the method of one or more Aspects of Aspects 1-15.

Aspect 30: A device for wireless communication, comprising a memory and one or more processors coupled to the memory, the memory and the one or more processors configured to perform the method of one or more Aspects of Aspects 1-15.

Aspect 31: An apparatus for wireless communication, comprising at least one means for performing the method of one or more Aspects of Aspects 1-15.

Aspect 32: A non-transitory computer-readable medium storing code for wireless communication, the code comprising instructions executable by a processor to perform the method of one or more Aspects of Aspects 1-15.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 34: An apparatus for wireless communication at a device, comprising a processor; memory coupled with the processor; and instructions stored in the memory and executable by the processor to cause the apparatus to perform the method of one or more Aspects of Aspects 16-28.

Aspect 35: A device for wireless communication, comprising a memory and one or more processors coupled to the memory, the memory and the one or more processors configured to perform the method of one or more Aspects of Aspects 16-28.

Aspect 36: An apparatus for wireless communication, comprising at least one means for performing the method of one or more Aspects of Aspects 16-28.

Aspect 37: A non-transitory computer-readable medium storing code for wireless communication, the code comprising instructions executable by a processor to perform the method of one or more Aspects of Aspects 16-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 16-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors coupled to the memory, the one or more processors configured to:
   transmit, to a network node, control information comprising beamforming capability information comprising:
   a first switching gap that indicates a first amount of time associated with the UE switching from an analog beamforming mode to a digital beamforming mode, and
   a second switching gap that indicates a second amount of time, different from the first amount of time, associated with the UE switching from the digital beamforming mode to the analog beamforming mode;
   receive, from the network node and based at least in part on transmitting the control information, a resource allocation comprising:
   a first set of periodic time domain resources associated with the UE using the analog beamforming mode and a first analog to digital converter (ADC),
   a second set of periodic time domain resources associated with the UE using the digital beamforming mode and a second ADC having a lower resolution and a lower power consumption than the first ADC,
   a third set of periodic time domain resource-resources associated with the first switching gap, and
   a fourth set of periodic time domain resource-resources associated with the second switching gap; and
   receive, from the network node and in a dedicated symbol in one of the first set of periodic time domain resources, a channel state information-reference signal (CSI-RS) based at least in part on the UE using the analog beamforming mode and the first ADC, wherein the CSI-RS is received independent from multiplexing with another signal in the dedicated symbol.

2. The UE of claim 1, wherein the beamforming capability information is associated with a millimeter wave frequency.

3. The UE of claim 1, wherein the beamforming capability information is included in a UE capability report.

4. The UE of claim 1, wherein the one or more processors are further configured to communicate, after receiving the CSI-RS and based at least in part on the UE using the digital beamforming mode and the second ADC, with the network node.

5. The UE of claim 4, wherein the one or more processors, to communicate with the network node, are configured to communicate at least one of data signals or control signals with the network node.

6. The UE of claim 1, wherein the one or more processors are further configured to determine CSI based at least in part on the CSI-RS and by using a machine learning procedure.

7. The UE of claim 1, wherein the control information is transmitted using medium access control (MAC) signaling, uplink control information (UCI), or radio resource control (RRC) signaling.

8. The UE of claim 1, wherein the resource allocation is based at least in part on the beamforming capability information.

9. The UE of claim 1, wherein the resource allocation is received before or after the first switching gap or the second switching gap.

10. A network node for wireless communication, comprising:
    memory; and
    one or more processors coupled to the memory, the one or more processors configured to:
    receive, from a user equipment (UE), control information comprising beamforming capability information comprising:
    a first switching gap that indicates a first amount of time associated with the UE switching from an analog beamforming mode to a digital beamforming mode, and
    a second switching gap that indicates a second amount of time, different from the first amount of time, associated with the UE switching from the digital beamforming mode to the analog beamforming mode;
    transmit, to the UE, a resource allocation, based at least in part on the beamforming capability information, comprising:
    a first set of periodic time domain resources associated with the UE using the analog beamforming mode and a first analog to digital converter (ADC), a second set of periodic time domain resources associated with the UE using the digital beamforming mode and a second ADC having a lower resolution and a lower power consumption than the first ADC, a third set of periodic time domain resources associated with the first switching gap, and a fourth set of periodic time domain resources associated with the second switching gap; and transmit, to the UE and in a dedicated symbol in one of the first set of periodic time domain resources, a channel state information-reference signal (CSI-RS) associated with the UE using the analog beamforming mode and the first ADC, wherein the CSI-RS is transmitted independent from multiplexing with another signal in the dedicated symbol.

11. The network node of claim 10, wherein the beamforming capability information is associated with a millimeter wave frequency.

12. The network node of claim 10, wherein the beamforming capability information is included in a UE capability report.

13. The network node of claim 10, wherein the one or more processors are further configured to communicate, after transmitting the CSI-RS and using one of the second set of periodic time domain resources, with the UE.

14. The network node of claim 13, wherein the one or more processors to communicate with the UE, are configured to communicate at least one of data signals or control signals with the UE.

15. The network node of claim 10, wherein the control information is received via medium access control (MAC) signaling, uplink control information (UCI), or radio resource control (RRC) signaling.

16. The network node of claim 10, wherein the one or more processors are configured to:

determine the resource allocation based at least in part on the beamforming capability information.

17. The network node of claim 10, wherein the resource allocation is transmitted before or after the first switching gap or the second switching gap.

18. A method of wireless communication performed by a user equipment (UE), comprising:

transmitting, to a network node, control information comprising beamforming capability information comprising:

a first switching gap that indicates a first amount of time associated with the UE switching from an analog beamforming mode to a digital beamforming mode, and a second switching gap that indicates a second amount of time, different from the first amount of time, associated with the UE switching from the digital beamforming mode to the analog beamforming mode;

receiving, from the network node and based at least in part on transmitting the control information, a resource allocation comprising:

a first set of periodic time domain resources associated with the UE using the analog beamforming mode and a first analog to digital converter (ADC), a second set of periodic time domain resources associated with the UE using the digital beamforming mode and a second ADC having a lower resolution and a lower power consumption than the first ADC, a third set of periodic time domain resources associated with the first switching gap, and a fourth set of periodic time domain resources associated with the second switching gap; and receiving, from the network node and in a dedicated symbol in one of the first set of periodic time domain resources, a channel state information-reference signal (CSI-RS) based at least in part on the UE using the analog beamforming mode and the first ADC, wherein the CSI-RS is received independent from multiplexing with another signal in the dedicated symbol.

19. The method of claim 18, wherein the beamforming capability information is associated with a millimeter wave frequency.

20. The method of claim 18, further comprising:

communicating, after receiving the CSI-RS and based at least in part on the UE using the digital beamforming mode and the second ADC, with the network node.

21. The method of claim 18, wherein the beamforming capability information is included in a UE capability report.

22. The method of claim 18, wherein the control information is transmitted using medium access control (MAC) signaling, uplink control information (UCI), or radio resource control (RRC) signaling.

23. A method of wireless communication performed by a network node, comprising:

receiving, from a user equipment (UE), control information comprising beamforming capability information comprising:

a first switching gap that indicates a first amount of time associated with the UE switching from an analog beamforming mode to a digital beamforming mode, and a second switching gap that indicates a second amount of time, different from the first amount of time, associated with the UE switching from the digital beamforming mode to the analog beamforming mode;

transmitting, to the UE, a resource allocation, based at least in part on the beamforming capability information, comprising:

a first set of periodic time domain resources associated with the UE using the analog beamforming mode and a first analog to digital converter (ADC), a second set of periodic time domain resources associated with the UE using the digital beamforming mode and a second ADC having a lower resolution and a lower power consumption than the first ADC, a third set of periodic time domain resources associated with the first switching gap, and a fourth set of periodic time domain resources associated with the second switching gap; and transmitting, to the UE and in a dedicated symbol in one of the first set of periodic time domain resources, a channel state information-reference signal (CSI-RS) associated with the UE using the analog beamforming mode and the first ADC, wherein the CSI-RS is transmitted independent from multiplexing with another signal in the dedicated symbol.

24. The method of claim 23, wherein the beamforming capability information is associated with a millimeter wave frequency.

25. The method of claim 23, further comprising:
communicating, after transmitting the CSI-RS and using one of the second set of periodic time domain resources, with the UE.

26. The method of claim 25, wherein communicating with the UE comprises at least one of:
communicating, after transmitting the CSI-RS and using one of the second set of periodic time domain resources, at least one of data signals or control signals based at least in part on the digital beamforming mode.

27. The method of claim 23, wherein the beamforming capability information is included in a UE capability report.

28. The method of claim 23, further comprising communicating based at least in part on the digital beamforming mode.

29. The method of claim 23, wherein the control information is received via medium access control (MAC) signaling, uplink control information (UCI), or radio resource control (RRC) signaling.

30. The method of claim 23, wherein the resource allocation is based at least in part on the beamforming capability information.

\* \* \* \* \*